United States Patent [19]

Kaeriyama et al.

[11] Patent Number: 4,740,849
[45] Date of Patent: Apr. 26, 1988

[54] GUIDE ARRANGEMENTS FOR MAINTAINING MAGNETIC TAPE IN PROPER POSITION RELATIVE TO A HEAD

[75] Inventors: Takuya Kaeriyama, Kanagawa; Masanori Kimizuka, Tokyo; Masayuki Kondo; Kenji Kawakami, both of Kanagawa, all of Japan

[73] Assignee: Sony Corporation, Japan

[21] Appl. No.: 884,521

[22] Filed: Jul. 11, 1986

[30] Foreign Application Priority Data

Jul. 17, 1985 [JP] Japan ................................. 60-157924

[51] Int. Cl.⁴ .............................................. G11B 15/61
[52] U.S. Cl. ........................................................ 360/84
[58] Field of Search ....................................... 360/84, 85

[56] References Cited

U.S. PATENT DOCUMENTS

| | | | |
|---|---|---|---|
| 3,691,315 | 9/1972 | Ellmore | 179/100.2 T |
| 3,773,983 | 11/1973 | Larson | 179/100.2 T |
| 3,990,110 | 11/1976 | Gunschmann | 360/84 |
| 4,040,575 | 8/1977 | Ryan | 360/84 |

FOREIGN PATENT DOCUMENTS 3300378 7/1984 Fed. Rep. of Germany .
2131997 6/1984 United Kingdom .

*Primary Examiner*—Robert S. Tupper
*Attorney, Agent, or Firm*—Ronald P. Kananen

[57] ABSTRACT

A tape guide arrangement for a tape recording and reproducing apparatus comprises a cylinder device provided with a rotary head, a first slant guide member for feeding a tape to the cylinder device, a second slant guide member for guiding the tape from the cylinder device into a predetermined direction, a first rotary guide member for guiding the tape to the first slant guide member, and a second rotary guide member for causing the tape from the second slant guide member to pass through a predetermined position. Each of the first and second rotary guide members is provided with an axis of rotation substantially perpendicular to an imaginary plane defined in relation to positions which are set on the first and second slant guide members and the cylinder device, respectively, and through which an elongated edge of the tape passes. Further, the first rotary guide member is so positioned that the tape is led to the first rotary guide member with a first gradient in reference to the imaginary plane and then guided to the first slant guide member with a second gradient opposite in up and down to the first gradient, and the second rotary guide member is so placed that the tape is guided to the second rotary guide member from the first slant guide member with a third gradient in reference to the imaginary plane and then leaves for the predetermined position with a fourth gradient opposite in up and down to the third gradient.

12 Claims, 3 Drawing Sheets

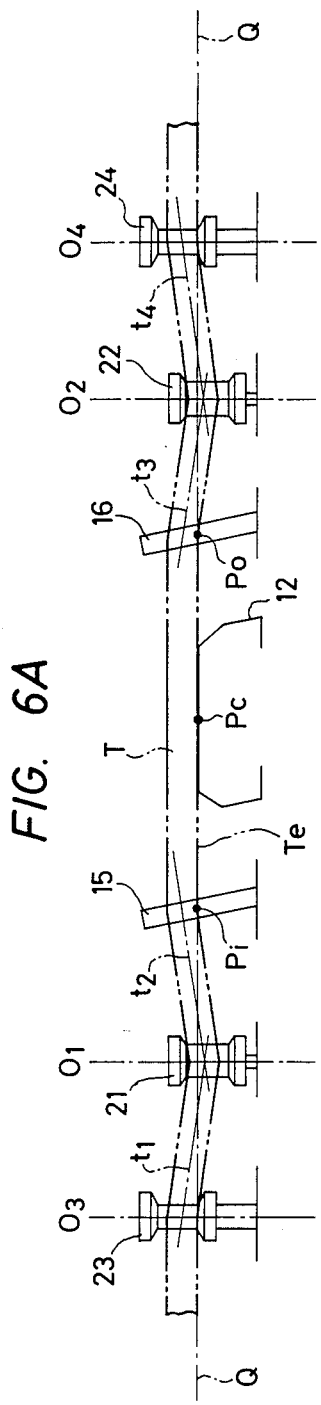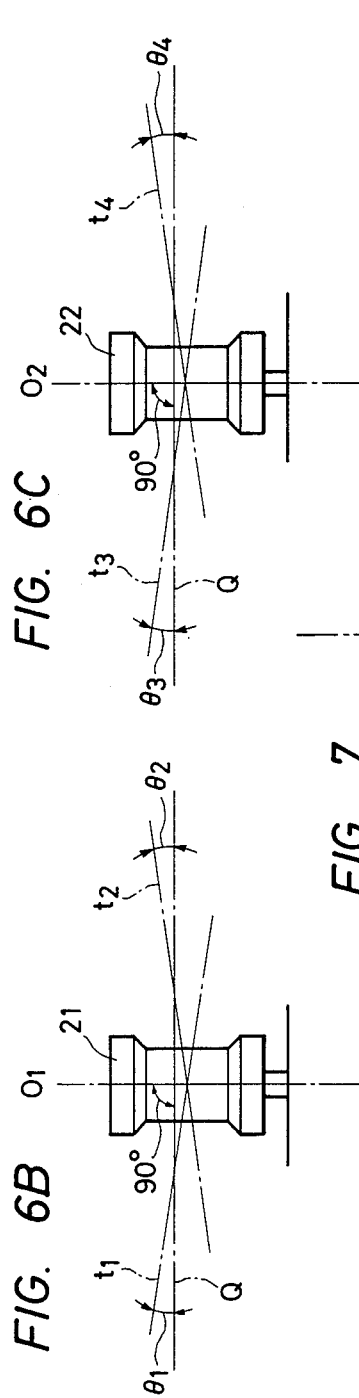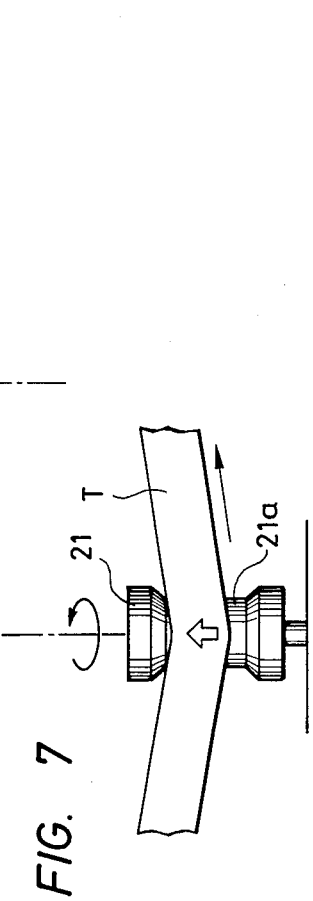

GUIDE ARRANGEMENTS FOR MAINTAINING MAGNETIC TAPE IN PROPER POSITION RELATIVE TO A HEAD

BACKGROUND OF THE INVENTION

The present invention relates generally to tape guide arrangements for guiding a tape through a tape recording and reproducing apparatus, and more particularly, to a tape guide arrangement which determines a running path for a tape in a tape recording and reproducing apparatus used with the tape for recording or reproducing information signals. Still more particularly, this invention relates to the use of tape guide rollers in a defined tape running path for changing the direction of travel of the tape to exert a downward biasing force on the tape as it contacts a rotary magnetic head.

DESCRIPTION OF THE PRIOR ART

In a magnetic recording and reproducing apparatus for recording or reproducing an information signal from a magnetic tape by use of a rotary magnetic head, the magnetic tape is caused to run so that the tape is successively provided thereon with scanning tracks by the rotary magnetic head. A running path of the magnetic tape as it moves through the apparatus is determined by a tape guide arrangement for guiding tape along a predetermined path through the apparatus.

A previously proposed tape guide arrangement for defining a running path for a magnetic tape in a magnetic recording and reproducing apparatus provided with a rotary magnetic head in this manner is shown in FIG. 1 of the accompanying drawings. In FIG. 1, a cylinder device 11 comprising a stationary lower cylinder 13 and a rotary upper cylinder 14 is mounted obliquely relative to an axis perpendicular to a reference plane 10, and a rotary magnetic head is provided in the cylinder device 11 for rotation with its tip projecting slightly from the surface of the cylinder device 11. The tip thus contacts a magnetic tape T which runs on and thus contacts the surface of the cylinder device 11. The stationary lower cylinder 13 of the cylinder device 11 is fixed relative to the reference plane 10 with a tape position control member 12 attached to a portion of its surface. The rotary upper cylinder 14 of the cylinder device 11 with an attached rotary magnetic head is located over the stationary lower cylinder 13 and is rotatable relative to the lower cylinder. The tape position control member 12 mounted on the stationary lower cylinder 13 engages a lower elongated edge Te of the magnetic tape T running on the surface of the cylinder device 11 and causes the magnetic tape T to be positioned for proper scanning by the rotary magnetic head rotating with its tip projecting slightly from the outer surface of the cylinder device 11.

A lead-in slant guide pin 15 is located relative to the cylinder device 11 thus constituted for feeding the magnetic tape T to the surface of the cylinder device 11. A lead-out slant guide pin 16 is similarly provided for leading the magnetic tape T from the surface of the cylinder device 11. The lead-in slant guide pin 15 and the lead-out slant guide pin 16 are respectively positioned to lie obliquely to a vertical axis in the reference plane 10. A lead-in guide roller 17 for feeding the magnetic tape T to the lead-in slant guide pin 15 and a lead-out guide roller 18 for controlling the position of the magnetic tape T which has passed through the lead-out slant guide pin 16 are respectively positioned on the reference plane 10 with their respective rotating axes upright and perpendicular relative to the reference plane 10.

The members 11 to 18 define a portion of a running path for the magnetic tape T passing through the cylinder device 11 and its environs. Hereinafter, such a portion of the running path is referred to as a "head-contacting running path section." In the head-contacting running path section, the magnetic tape T is led to the cylinder device 11 through the lead-in slant guide pin 15 from the lead-in guide roller 17 and then is sent out from the lead-out guide roller 18 through the lead-out slant guide pin 16 after passing through the cylinder device 11. A plurality of scanning tracks are formed on the magnetic tape T by the rotary magnetic head while the magnetic tape T runs on the surface of the cylinder device 11.

In such a tape guide arrangement for determining the head-contacting running path section of the magnetic tape T, it is desired for smooth running of the magnetic tape T and easy design and adjustment of various parts that each of the following three conditions (a), (b) and (c) is satisfied: (a) the magnetic tape T is not twisted in the head-contacting running path section; (b) the magnetic tape T runs parallel to the reference plane 10 before entering into and after coming out of the head-contacting running path section; and (c) the magnetic tape T is positioned at the same level in height from the reference plane 10 at both an entrance position and an exit position of the head-contacting running path section.

Accordingly, in an ideal design concept for the tape guide arrangement shown in FIG. 1 to satisfy those conditions, the tape position control member 13, the lead-in and lead-out slant guide pins 15 and 16, and the lead-in and lead-out guide rollers 17 and 18 should be so arranged on the reference plane 10 that the magnetic tape T runs parallel to the reference plane 10 throughout the head-contacting running path section and the lower elongated edge Te of the magnetic tape T is maintained in contact with the tape position control member 12 so that the magnetic tape T is properly controlled by the tape position control member 12, as shown in FIG. 2. However, in the case where this ideal design concept for the tape guide arrangement shown in FIG. 1 is exactly realized, the lower elongated edge Te of the magnetic tape T is not forced to come in contact with the tape position control member 12. Therefore, if the magnetic tape T is moved to cause the lower elongated edge Te to be remote from the tape position control member 12 while traversing the cylinder device, no restoring force acts upon the magnetic type T to return the tape to the former position. Consequently, the magnetic tape T is not properly controlled in its position on the surface of the cylinder device 11.

Accordingly, in actuality as shown for the embodiment of FIG. 3, a downwardly-directed force acts on the magnetic tape T to cause the lower elongated edge Te thereof to come in contact with the tape position control member 12. A lead-in stationary guide pin 19 for guiding the magnetic tape T to the lead-in guide roller 17 and a lead-out stationary guide pin 20 guiding the magnetic tape T exiting from the lead-out guide roller 18 are provided. The pins 19 and 20 are positioned in an upright manner generally perpendicular to the reference plane 10 as additional members to establish the head-contacting running path section together with the members 11 to 18. A tape engaging portion of each of the lead-in and lead-out stationary guide pins 19 and 20 is positioned to be higher than a tape engaging portion of each of the lead-in and lead-out guide rollers 17 and 18, as seen in FIG. 3. In such an arrangement, the aforementioned three conditions (a), (b) and (c) are satisfied. Furthermore, the magnetic tape T runs parallel to the reference plane 10 to reach the lead-in stationary guide pin 19, and is guided to the lead-in guide roller 17 with a downward gradient from the lead-in stationary guide pin 19. Then, the magnetic tape T runs parallel to the reference plane 10 from the lead-in guide roller 17 through the lead-in slant guide pin 15, the cylinder device 11 and the lead-out slant guide pin 16 to the lead-out guide roller 18. Therefore, the tape T is guided to the lead-out stationary guide pin 20 with an uphill gradient from the lead-out guide roller 18 so as to exit from the lead-out stationary guide pin 20 in a direction parallel to the reference plane 10.

In this manner, the magnetic tape T is led to the lead-in guide roller 17 with the downward gradient and forwarded from the lead-out guide roller 18 with the upward gradient so that the tape is bent in the direction of its width at each of the lead-in and lead-out guide rollers 17 and 18. As a result, a reaction force due to such bending of the tape acts upon the magnetic tape T to cause the lower elongating edge Te to come in contact with the tape position control member 12. Consequently, the magnetic tape T is maintained and controlled in its position on the surface of the cylinder device 11 by the tape position control member 12.

However, in the case where the magnetic tape T is led to the lead-in guide roller 17 with the downward gradient and forwarded from the lead-out guide roller 18 with the upward gradient as described above, the magnetic tape T is undesirably forced to slide up along the lead-in guide roller 17 with the rotation of the lead-in guide roller 17. The tape T is also undesirably forced to slide down along the lead-out guide roller 18 with the rotation of the lead-out guide roller 18. Consequently, the magnetic tape T may deviate from portions of a proper running path which are appropriately defined by the lead-in stationary guide pin 19 and the lead-in guide roller 17, and the lead-out guide roller 18 and the lead-out stationary guide pin 20, respectively. The tape T therefore runs along an improper head-contacting running path section formed undesirably about the cylinder device 11.

OBJECTS AND SUMMARY OF THE INVENTION

Accordingly, it is an object of the present invention to provide a tape guide arrangement for a tape recording and reproducing apparatus which avoids the foregoing disadvantages and problems of the prior art.

Another object of the present invention is to provide a tape guide arrangement for a tape recording and reproducing apparatus which includes a cylinder device provided therein with a rotary head and provided also thereon with a tape position control member, lead-in and lead-out slant guide members, and lead-in and lead-out rotary guide members arranged to define a head-contacting running path section for a tape, and by which the tape is stably maintained to run properly along the head-contacting running path section.

A further object of the present invention is to provide a tape guide arrangement for a tape recording and reproducing apparatus which includes a cylinder device provided therein with a rotary head and provided also thereon with a tape position control member, lead-in and lead-out slant guide members, and lead-in and lead-out rotary guide members arranged to define a head-contacting running path section for a tape, and by which the tape is guided to run along the head-contacting running path section with one extending edge thereof forced to maintain contact with the tape position control member without being forced undesirably to slide up or down along the lead-in rotary guide member and the lead-out rotary guide member.

In accordance with the present invention, there is provided a tape guide arrangement for a tape recording and reproducing apparatus comprising a cylinder device provided with a rotary head therein and with a tape position control member on its surface; a lead-in slant guide member for feeding a tape to the cylinder device to cause the tape to pass through the surface of the cylinder device with one elongated thereof being in contact with the tape position control member; a lead-out slant guide member for guiding the tape having passed the surface of the cylinder device into a predetermined direction; a lead-in rotary guide member for guiding the tape to the lead-in slant guide member; and a lead-out rotary guide member for causing the tape having passed the lead-out slant guide member to pass through a predetermined position. Each of the lead-in and lead-out rotary guide members is provided with an axis of rotation substantially perpendicular to an imaginary plane substantially including a center of a portion of the tape position control member with which the elongated edge of the tape comes in contact and portions of the lead-in and lead-out slant guide members which the elongated edge of the tape passes respectively. Further, the lead-in rotary guide member is placed at such a position as to guide the tape arriving thereat with a first gradient in relation to the imaginary plane to the lead-in slant guide member with a second gradient opposite in an up and down direction to the first gradient, and the lead-out rotary guide member is placed at such a position as to cause the tape coming from the lead-out slant guide member with a third gradient in relation to the imaginary plane to leve therewith a fourth gradient opposite in an up and down direction to the third gradient.

With the tape guide arrangement thus constituted in accordance with the present invention, the tape is guided to run along a head-contacting running path section formed through the cylinder device and its environs by the arrangement with the tape position control member without sliding up or down undesirably at the lead-in rotary guide member and the lead-out rotary guide member, and therefore is stably guided to pass through the surface of the cylinder device under a proper and successive positional control by the tape position control member.

The above, and other objects, features and advantages of the present invention will become apparent from the following detailed description which is to be read in conjunction with the accompanying drawings.

BRIEF DESCRIPTION OF THE DRAWINGS

FIGS. 6A, 6B, 6C and 7 are illustrations used for explaining the working of the embodiment shown in FIG. 4.

DETAILED DESCRIPTION OF THE PREFERRED EMBODIMENT

Figure 1:
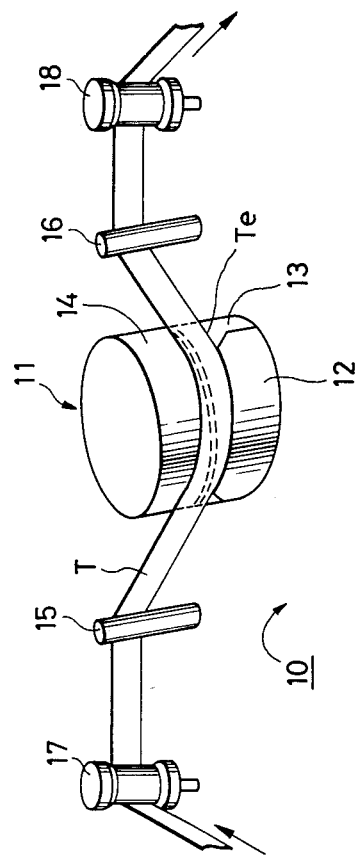
FIG. 1 is a schematic prespective view showing a previously proposed tape guide arrangement for a tape recording and reproducing apparatus.
Figure 2:
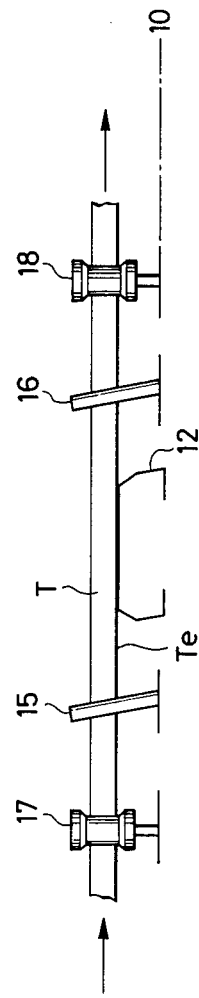
FIGS. 2 and 3 are conceptual illustrations used for explanation of the previously proposed tape guide arrangement shown in FIG. 1.
Figure 3:
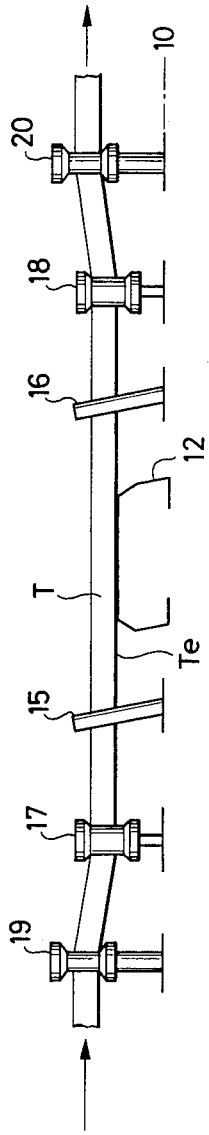

FIGS. 1-3 have previously been described in connection with the background of the invention as illustrative of a prior art apparatus.

Figure 4:
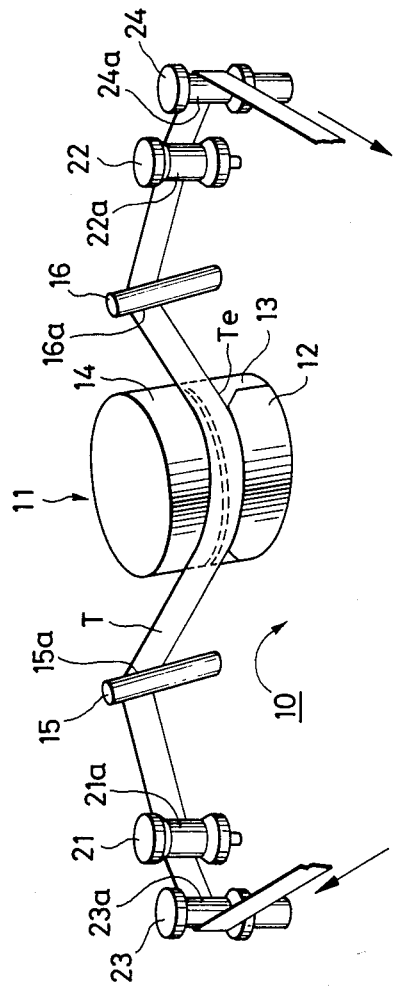
FIG. 4 is a schematic perspective view showing an embodiment of tape guide arrangement for a tape recording and reproducing apparatus according to the invention.

FIG. 4 shows an example of a tape guide arrangement for a tape recording and reproducing apparatus according to the present invention. This example is applied to a magnetic recording and reproducing apparatus having a rotary magnetic head for establishing a running path for a magnetic tape through the apparatus, which is generally similar to the tape guide arrangement shown in FIG. 1. In the FIG. 4 device, members and parts corresponding to those of FIG. 1 are marked with the same reference numerals and further description thereof will be omitted.

In this example, a lead-in slant guide pin 15 is provided for feeding a magnetic tape T to the cylinder device 11 to cause the tape to pass along the surface of the cylinder device 11 with its lower elongating edge Te in contact with a tape position control member 12. A lead-out slant guide pin 16 is also provided for guiding the magnetic tape T having passed from the surface of the cylinder device 11 in a predetermined direction. A lead-in guide roller 21 guides the magnetic tape T to the lead-in slant guide pin 15 in such a manner that the magnetic tape T is inclined relative to a reference plane 10 for mounting. A lead-out guide roller 22 causes the magnetic tape T having passed the lead-out slant guide pin 16 to pass through a predetermined position in such a manner that the magnetic tape T is inclined relative to the reference plane 10. The lead-in slant guide pin 15, the lead-out slant guide pin 16, the lead in guide roller 21, and the lead-out guide roller 22 are respectively provided on the reference plane 10. The lead-in guide roller 21 is disposed so that a tape-engaging portion 21a thereof is placed at a position lower than a tape-engaging portion 15a of the lead-in slant guide pin 15 against which the magnetic tape T passes. The lead-out guide roller 22 is so disposed that a tape engaging portion 22a thereof is placed at a position lower than a tape-engaging portion 16a of the lead-out slant guide pin 16 against which the magnetic tape T passes.

A lead-in stationary guide pin 23 guides the magnetic tape T to the lead-in guide roller 21 in such a manner that the magnetic tape T is inclined relative to the reference plane 10. A lead-out stationary guide pin 24 causes the magnetic tape T which has passed the lead-out roller 22 to pass through a predetermined position in such a manner that the magnetic tape T is inclined relative to the reference plane 10. The lead-in stationary guide pin 23 and the lead-out stationary guide pin 24 are also provided on the reference plane 10. The lead-in stationary guide pin 23 is located so that a tape-engaging portion 23a thereof is placed at a position higher than the tape engaging portion 21a of the lead-in guide roller 21. Similarly, the lead-out stationary guide pin 24 is located so that a tape engaging portion 24a thereof is placed at a position higher than the tape engaging portion 22a of the lead-out guide roller 22.

Figure 5:
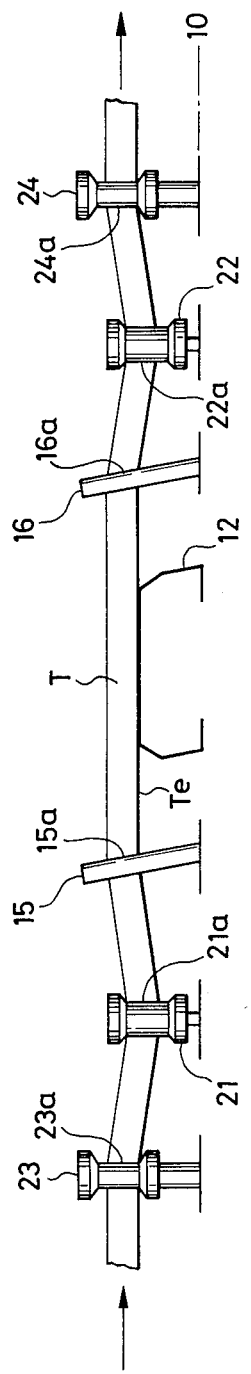
FIG. 5 is a conceptual illustration used for explanation of the embodiment shown in FIG. 4.

In the tape guide arrangement shown in FIG. 4, a head-contacting running path section for the magnetic tape T is established as described above and as shown in the conceptual illustration of FIG. 5. The lead-in and lead-out slant guide pins 15 and 16 cooperate to cause the magnetic tape T to run along the surface of the cylinder device 11 in parallel with the reference plane 10 so that the lower elongated edge Te of the tape T is forced to maintain contact with the tape position control member 12. Thus, the magnetic tape T is under the positional control of the tape position control member 12. The lead-in and lead-out guide rollers 21 and 22 and the lead-in and lead-out stationary guide pins 23 and 24 are respectively positioned on the reference plane 10 perpendicularly thereto. Thus, the magnetic tape T enters the lead-in stationary guide pin 23 is parallel with the reference plane 10 and exits the lead-out stationary guide pin 24 in parallel with the reference plane 10.

The path of the tape T through the apparatus of FIG. 4 is shown in FIG. 5. The path so defined constitutes a portion of the running path through the apparatus. The magnetic tape T enters the lead-in stationary guide pin 23 is parallel with the reference plane 10 and is guided to the lead-in guide roller 21 from the lead-in stationary guide pin 23 with a downward gradient. The tape T is further guided to the lead-in slant guide pin 15 from the lead-in guide roller 21 with an upward gradient. Thus, the magnetic tape T enters the lead-in slant guide pin 15 and runs parallel with the reference plane 10 from the lead-in slant guide pin 15 through the tape position control 12 provided on the cylinder device 11 to the lead-out slant guide pin 16. The magnetic tape T then enters the lead-out slant guide pin 16 and is guided to the lead-out guide roller 22 from the lead-out slant guide pin 16 with a downward gradient. The tape T is further guided to the lead-out stationary guide pin 24 from the lead-out guide roller 22 with an upward gradient. Finally, the magnetic tape T leaves the lead-out stationary guide 24 in parallel with the reference plane 10.

Accordingly, as shown in FIG. 6A, an imaginary plane Q includes a position therein which is substantially at the center Pc of a portion of the tape position control member 12 with which the lower elongated edge Te of the magnetic tape T comes in contact and portions Pi and Po of the lead-in and lead-out slant guide pins 15 and 16 through which the lower elongated edge Te of the magnetic tape T passes through respectively. The imaginary plane Q lies parallel to the reference plane 10. Further, as shown in FIGS. 6B and 6C, respectively, an axis $O_1$ of rotation of the lead-in guide roller 21 and an axis $O_2$ of rotation of the lead-out guide roller 22 are perpendicular to the imaginary plane Q. Similarly, an axis $O_3$ of rotation of the lead-in stationary guide pin 23 and an axis $O_4$ of rotation of the lead-out stationary guide pin 24 are also perpendicular to the imaginary plane Q, respectively, as shown in FIG. 6A.

A center line $t_1$ of the magnetic tape T between the lead-in stationary guide pin 23 and the lead-in guide roller 21 and a center line $t_2$ of the magnetic tape T between the lead-in guide roller 21 and the lead-in slant guide pin 15 are respectively inclined downward with a tilt angle $\theta_1$ and upward with a tilt angle $\theta_2$ in reference to the imaginary plane Q respectively as shown in FIGS. 6A and 6B. A center line $t_3$ of the magnetic tape T between the lead-out guide pin 16 and the lead-out guide roller 22 and a center line $t_4$ of the magnetic tape T between the lead-out guide roller 22 and the lead-out stationary guide pin 24 are respectively inclined downward and upward with a tilt angle $\theta_3$ and $\theta_4$ with respect to the imaginary plane Q, respectively, as shown in FIGS. 6A and 6B. The tilt angles $\theta_1$, $\theta_2$, $\theta_3$ and $\theta_4$ are selected, for example, to meet the relationship that $\theta_1$ is substantially equal to $\theta_2$ and $\theta_3$ is substantially equal to $\theta_4$.

As described above and shown in FIGS. 5, 6A, 6B and 6C, the magnetic tape T enters the lead-in slant guide pin 15 from the lead-in guide roller 21 with the upward gradient and is further led to the lead-out guide roller 22 from the lead-out slant guide pin 16 with the downward gradient. Therefore, the magnetic tape T is forced to cause the lower elongated edge Te thereof to be in contact with the tape position control member 12 on the surface of the cylinder device 11, so that positional control of the magnetic tape T on the surface of the cylinder device 11 is properly successively accomplished by the tape position control member 12.

As shown in FIG. 7, the magnetic tape T is led to the lead-in guide roller 21 with the downward gradient and leaves the lead-in guide roller 21 with the upward gradient so as to be bent into the shape of V at the lead-in guide roller 21. Therefore, no force acts upon the magnetic tape T to cause the same to slide up or down undesirably along the lead-in guide roller 21. However, an upward reaction force due to the bend of the magnetic tape T acts upon the magnetic tape T at the lead-in guide roller 21, as shown with an arrow in FIG. 7. This upward reaction force cannot move the magnetic tape T upwardly because an upper flange provided at the tape engaging portion 21a of the lead-in guide roller 21 prevents the magnetic tape T from moving upwardly. Similarly, the magnetic tape T is led to the lead-out guide roller 22 with the downhill gradient and leaves the lead-out guide roller 22 with the upward gradient so as to be bent into the shape of V at the lead-out guide roller 22. Therefore, similar to the location described as to the guide roller 21, no force acts upon the magnetic tape T to cause the tape to slide up or down undesirably along the lead-out guide roller 22. However, as above, an upward reaction force due to the bend of the magnetic tape T acts upon the magnetic tape T at the lead-out guide roller 22. In this case as well, the upward reaction force cannot move the magnetic tape T upwardly because an upper flange provided to the tape engaging portion 22a of the lead-out guide roller 22 prevents the magnetic tape T from moving upwardly.

Consequently, the magnetic tape T is guided to run properly along the head-contacting running path section formed with a first running path portion set up by the lead-in stationary guide pin 23, lead-in guide roller 21 and lead-in slant guide pin 15 and a second running path portion set up by the lead-out slant guide pin 16, lead-out guide roller 22 and lead-out stationary guide pin 24, successive to the first running path portion, without sliding up or down undesirably at the lead-in guide roller 21 and the lead-out guide roller 22.

What is claimed is:

1. A tape guide arrangement for a tape recording and reproducing apparatus comprising:
   a cylinder device provided with a rotary head and a tape position control member;
   first slant guide means for feeding a tape to the cylinder device to cause the tape to pass said cylinder device with one elongated edge of the tape in contact with the tape position control member, said first slant guide means comprising a first slant guide member;
   first rotary guide means guiding the tape to said first slant guide means with a first gradient relative to an imaginary plane passing through the center of a portion of a path defined by said tape position control member, said first rotary guide means comprising a first rotary guide member;
   lead-in guide means for guiding the tape to said first rotary guide means at a second gradient relative to the imaginary plane, the second gradient being opposite in direction to the first gradient;
   second slant guide means for guiding in a predetermined direction the tape which has passed said cylinder device, said second slant guide means comprising a second slant guide member;
   second rotary guide means for guiding the tape from said second slant guide means at a third gradient relative to the imaginary plane; and
   lead-out guide means for guiding the tape from said second rotary guide means at a fourth gradient relative to the imaginary plane, the fourth gradient being opposite in direction to the third gradient.

2. The arrangement as set forth in claim 1, wherein each of said first and said second rotary guide members is provided with an axis of rotation which is substantially perpendicular to said imaginary plane.

3. The arrangement as set forth in claim 2, wherein said imaginary plane substantially includes portions of said first and second slant guide members.

4. A tape guide arrangement according to claim 1, wherein each of said first and said second rotary guide members has a flange at least at one end of a portion thereof with which another elongated edge of said tape comes into contact.

5. A tape guide arrangement according to claim 1, wherein said first and said second gradients are selected to be substantially equal to each other in the angular value, and said third and said fourthgradients are selected to be substantially equal to each other in angular value.

6. A tape guide arrangement according to claim 1, wherein the tape is substantially parallel to the imaginary plane upstream of the lead-in guide means and downstream of the lead-out guide means.

7. A tape guide arrangement according to claim 6, wherein the first and third gradients have components toward the imaginary plane, and the second and fourth gradients have components away from the imaginary plane.

8. A tape guide arrangement as set forth in claim 6, wherein the tape upstream of the lead-in guide means and the tape downstream of the lead-out guide means are colinear.

9. A tape guide arrangement according to claim 1, wherein said lead-in guide means comprises a first stationary guide member and said lead-out guide means comprises a second stationary guide member, said first and second stationary members having axes perpendicular to the imaginary plane.

10. A tape guide arrangement for a tape recording and reproducing apparatus comprising a first slant guide member and a second slant guide member defining a portion of a tape running path therebetween which is parallel to an imaginary plane and passes a cylinder device having a rotary head and a tape position control member so that a tape in the tape running path contacts a surface of the cylinder device in a direction substantially parallel to the imaginary plane; first rotary guide means located upstream of said cylinder device in said tape head contacting tape running path for receiving said tape in a direction having a gradient toward said imaginary plane and causing said tape to exit therefrom to said first slant guide member with a gradient having a component away from said imaginary plane; and a lead-in stationary guide member located upstream of said first rotary guide means for receiving said tape in a direction substantially parallel to said imaginary plane and for causing said tape to exit therefrom to said first rotary guide means with a gradient toward said imaginary plane; and a second rotary guide means located downstream from said second slant guide member in said running path for receiving tape exiting said second slant guide in a direction having a component toward said imaginary plane and causing said tape to exit from said second rotary guide means with a gradient away from said imaginary plane; and a lead-out stationary guide pin located downstream from said second rotary guide means for receiving said tape in a direction having a gradient away from said imaginary plane and causing said tape to exit in a direction substantially parallel to said imaginary plane.

11. The tape guide arrangement as set forth in claim 10, wherein said first rotary guide means comprises a lead-in guide roller having an axis of rotation which is substantially perpendicular to said imaginary plane; and said second rotary guide comprises a lead-out guide roller having an axis of rotation substantially perpendicular to said imaginary plane.

12. The tape guide arrangement as set forth in claim 11, wherein each of said lead-in and said lead-out rollers includes a tape engaging portion located at a position nearer to said imaginary plane than tape engaging portions of said first and said second slant guide members.

* * * * *